US012453849B2

(12) United States Patent
VanCamp et al.

(10) Patent No.: US 12,453,849 B2
(45) Date of Patent: Oct. 28, 2025

(54) MECHANICAL CIRCULATORY SUPPORT PUMP DRIVE WITH CORROSION PROTECTION

(71) Applicant: Boston Scientific Scimed Inc., Maple Grove, MN (US)

(72) Inventors: Daniel H. VanCamp, Elk River, MN (US); Kimberly A. Robertson, Forest Lake, MN (US); Steven R. Larsen, Lino Lakes, MN (US)

(73) Assignee: Boston Scientific Scimed Inc., Maple Grove, MN (US)

( * ) Notice: Subject to any disclaimer, the term of this patent is extended or adjusted under 35 U.S.C. 154(b) by 284 days.

(21) Appl. No.: 16/825,654

(22) Filed: Mar. 20, 2020

(65) Prior Publication Data
US 2020/0306434 A1 Oct. 1, 2020

Related U.S. Application Data

(60) Provisional application No. 62/823,209, filed on Mar. 25, 2019.

(51) Int. Cl.
*A61M 60/419* (2021.01)
*A61M 60/216* (2021.01)
(Continued)

(52) U.S. Cl.
CPC ........ *A61M 60/419* (2021.01); *A61M 60/216* (2021.01); *A61M 60/416* (2021.01); *A61M 60/825* (2021.01); *A61M 2205/025* (2013.01)

(58) Field of Classification Search
CPC .............. A61M 60/419; A61M 60/818; A61M 60/205; A61M 60/40; A61M 60/422;
(Continued)

(56) References Cited

U.S. PATENT DOCUMENTS 4,589,822 A * 5/1986 Clausen .............. A61M 60/806
415/174.3
4,643,641 A * 2/1987 Clausen .............. A61M 60/232
415/174.3
(Continued)

FOREIGN PATENT DOCUMENTS

EP 3319098 A1 5/2018
EP 3456367 A1 3/2019
(Continued)

*Primary Examiner* — Courtney D Heinle
*Assistant Examiner* — Jesse M Prager
(74) *Attorney, Agent, or Firm* — Seager, Tufte & Wickhem LLP

(57) ABSTRACT

A blood pump includes an impeller; a drive shaft coupled to the impeller and configured to rotate with the impeller; and a rotor coupled to the drive shaft and configured to rotate with the drive shaft. The rotor includes a driven magnet having an outer surface. A corrosion-resistant coating may be disposed on the outer surface of the driven magnet. A stator is disposed adjacent the rotor and configured to drive the rotor, causing the rotor to rotate; and a motor is configured to drive the stator. A protection assembly may be disposed adjacent the stator and configured to receive an end of the drive shaft, and may include a protection assembly housing enclosing a protective fluid chamber, the protective fluid chamber including the driven magnet and at least a portion of a bearing configured to engage the end of the drive shaft.

11 Claims, 3 Drawing Sheets

(51) Int. Cl.
*A61M 60/416* (2021.01)
*A61M 60/825* (2021.01)

(58) Field of Classification Search
CPC .......... A61M 2205/025; A61M 60/135; A61M 60/829; A61M 60/00; A61M 60/825; A61M 60/416; A61M 60/81; A61M 60/82; A61M 60/827; F16C 17/04; F16C 17/08; F16C 2316/10; F16C 2316/18; F16C 17/105; F16C 17/107
See application file for complete search history.

(56) References Cited

U.S. PATENT DOCUMENTS

| | | | | |
|---|---|---|---|---|
| 4,722,661 A | * | 2/1988 | Mizuno | F04D 13/026 417/420 |
| 4,895,493 A | * | 1/1990 | Kletschka | A61M 60/38 417/420 |
| 4,927,407 A | * | 5/1990 | Dorman | F16J 15/162 600/16 |
| 5,017,103 A | * | 5/1991 | Dahl | A61M 60/419 417/420 |
| 5,147,186 A | * | 9/1992 | Buckholtz | F04D 13/06 464/29 |
| 5,399,145 A | * | 3/1995 | Ito | A61M 60/232 600/16 |
| 5,676,526 A | * | 10/1997 | Kuwana | A61M 1/3629 417/423.1 |
| 5,921,913 A | | 7/1999 | Siess | |
| 6,042,347 A | | 3/2000 | Scholl et al. | |
| 6,152,704 A | * | 11/2000 | Aboul-Hosn | F04D 13/04 604/151 |
| 8,114,008 B2 | * | 2/2012 | Hidaka | F04D 29/048 623/3.13 |
| 8,672,611 B2 | * | 3/2014 | LaRose | F04D 13/0666 415/104 |
| 10,520,025 B1 | * | 12/2019 | Peterson | A61M 60/148 |
| 10,857,273 B2 | * | 12/2020 | Hodges | A61M 60/122 |
| 2008/0200750 A1 | | 8/2008 | James | |
| 2009/0261692 A1 | * | 10/2009 | Horng | F16C 17/08 310/425 |
| 2013/0338559 A1 | * | 12/2013 | Franano | A61M 60/531 604/4.01 |
| 2014/0275722 A1 | | 9/2014 | Zimmermann et al. | |
| 2018/0050140 A1 | | 2/2018 | Siess et al. | |
| 2019/0275224 A1 | * | 9/2019 | Hanson | A61M 60/268 |
| 2020/0121835 A1 | * | 4/2020 | Farago | A61M 60/818 |
| 2020/0306434 A1 | | 10/2020 | Vancamp et al. | |
| 2022/0241580 A1 | * | 8/2022 | Stotz | A61M 60/126 |

FOREIGN PATENT DOCUMENTS

| | | | |
|---|---|---|---|
| JP | 2012193650 A | 10/2012 | |
| RU | 127630 U1 * | 5/2013 | |
| WO | 99/34847 A2 | 7/1999 | |
| WO | WO-2017205909 A1 * | 12/2017 | .......... A61M 1/1012 |

* cited by examiner

MECHANICAL CIRCULATORY SUPPORT PUMP DRIVE WITH CORROSION PROTECTION

CROSS REFERENCE TO RELATED APPLICATION

This application claims priority to Provisional Application No. 62/823,209, filed Mar. 25, 2019, which is herein incorporated by reference in its entirety.

TECHNICAL FIELD

The present disclosure relates to percutaneous circulatory support devices. More specifically, the disclosure relates to rotors in magnetic coupling systems used in percutaneous circulatory support devices.

BACKGROUND

Percutaneous circulatory support devices such as blood pumps typically provide circulatory support for up to approximately three weeks of continuous use, and often include magnetic motors. Commonly used magnetic materials contain cytotoxic elements such as Neodymium and/or iron that are susceptible to corrosion due to exposure to blood and/or other fluid. Additionally, surface shear, which would be high in an exposed spinning element of a percutaneous circulatory support pump, can cause hemolysis of red blood cells, which can lead to worse patient outcomes.

SUMMARY

Embodiments of the subject matter disclosed herein may facilitate protecting magnets associated with percutaneous circulatory support devices from the body and fluids within the body (e.g., by preventing corrosion of the magnets), and may facilitate protecting the body from the cytotoxicity and/or hemolysis that may be caused by the magnets. In embodiments, the magnets may be stators (and/or rotors) in an electric motor, and may be used to couple the motor to an impeller (e.g., via magnetic coupling). Embodiments may facilitate providing corrosion protection during sterilization, storage, and/or clinical use.

In an Example 1, a blood pump, comprising: an impeller; a drive shaft coupled to the impeller and configured to rotate with the impeller; a rotor coupled to the drive shaft and configured to rotate with the drive shaft, the rotor comprising a driven magnet having an outer surface; a corrosion-resistant coating disposed on the outer surface of the driven magnet; a stator disposed adjacent the rotor and configured to drive the rotor, causing the rotor to rotate; and a motor configured to drive the stator.

In an Example 2, the blood pump of Example 1, the coating comprising at least one of an amorphous silicone, a diamond-like coating, and a polymeric compound.

In an Example 3, the blood pump of either of Examples 1 or 2, wherein the rotor is integrated with the impeller.

In an Example 4, the blood pump of Example 3, wherein the coating is disposed over an outside surface of the impeller.

In an Example 5, the blood pump of either of Examples 1 or 2, further comprising a protection assembly disposed adjacent the stator and configured to receive an end of the drive shaft, the protection assembly comprising a protection assembly housing enclosing a protective fluid chamber, the protective fluid chamber comprising the driven magnet and at least a portion of a bearing configured to engage the end of the drive shaft.

In an Example 6, the blood pump of Example 5, the protection assembly housing comprising a base and peripheral wall extending away from the base, forming a cavity bounded, in part, by an inner surface of the peripheral wall and an inner surface of the base.

In an Example 7, the blood pump of Example 6, wherein at least a portion of the protective fluid chamber is defined between the inner surface of the peripheral wall of the protection assembly housing, an inner surface of the base of the protection assembly housing, and at least a first side of the bearing.

In an Example 8, the blood pump of Example 7, wherein the entire bearing is disposed within the protective fluid chamber.

In an Example 9, a blood pump, comprising: an impeller; a drive shaft coupled to the impeller and configured to rotate with the impeller; a rotor coupled to the drive shaft and configured to rotate with the drive shaft, the rotor comprising a driven magnet having an outer surface; a stator disposed adjacent the rotor and configured to drive the rotor, causing the rotor to rotate; a motor configured to drive the stator; and a protection assembly disposed adjacent the motor and configured to receive an end of the drive shaft, the protection assembly comprising a protection assembly housing enclosing a protective fluid chamber, the protective fluid chamber comprising the driven magnet and a at least a portion of a bearing configured to engage the end of the drive shaft.

In an Example 10, the blood pump of Example 9, the protection assembly housing comprising a cup washer having a base and peripheral wall extending away from the base, forming a cavity bounded, in part, by an inner surface of the peripheral wall and an inner surface of the base.

In an Example 11, the blood pump of Example 10, wherein at least a portion of the protective fluid chamber is defined between the inner surface of the peripheral wall of the cup washer, an inner surface of the base of the cup washer, and at least a first side of the bearing.

In an Example 12, the blood pump of any of Examples 9-11, wherein the entire bearing is disposed within the protective fluid chamber.

In an Example 13, the blood pump of any of Examples 9-12, further comprising a coating disposed on the outer surface of the driven magnet.

In an Example 14, the blood pump of Example 13, the coating comprising at least one of an amorphous silicone, a diamond-like coating, and a polymeric compound.

In an Example 15, the blood pump of any of Examples 9-14, wherein the rotor is integrated with the impeller.

In an Example 16, a blood pump, comprising: an impeller; a drive shaft coupled to the impeller and configured to rotate with the impeller; a rotor coupled to the drive shaft and configured to rotate with the drive shaft, the rotor comprising a driven magnet having an outer surface; a coating disposed on the outer surface of the driven magnet; a stator disposed adjacent the rotor and configured to drive the rotor, causing the rotor to rotate; and a motor configured to drive the stator.

In an Example 17, the blood pump of Example 16, the coating comprising at least one of an amorphous silicone, a diamond-like coating, and a polymeric compound.

In an Example 18, the blood pump of Example 16, wherein the rotor is integrated with the impeller.

In an Example 19, the blood pump of Example 18, wherein the coating is disposed over an outside surface of the impeller.

In an Example 20, the blood pump of Example 16, further comprising a protection assembly disposed adjacent the motor and configured to receive an end of the drive shaft, the protection assembly comprising a protection assembly housing enclosing a protective fluid chamber, the protective fluid chamber comprising the driven magnet and at least a portion of a bearing configured to engage the end of the drive shaft.

In an Example 21, the blood pump of Example 20, the protection assembly housing comprising a cup washer having a base and peripheral wall extending away from the base, forming a cavity bounded, in part, by an inner surface of the peripheral wall and an inner surface of the base.

In an Example 22, the blood pump of Example 21, wherein at least a portion of the protective fluid chamber is defined between the inner surface of the peripheral wall of the cup washer, an inner surface of the base of the cup washer, and at least a first side of the bearing.

In an Example 23, the blood pump of Example 22, wherein the entire bearing is disposed within the protective fluid chamber.

In an Example 24, a blood pump, comprising: an impeller; a drive shaft coupled to the impeller and configured to rotate with the impeller; a rotor coupled to the drive shaft and configured to rotate with the drive shaft, the rotor comprising a driven magnet having an outer surface; a stator disposed adjacent the rotor and configured to drive the rotor, causing the rotor to rotate; a motor configured to drive the stator; and a protection assembly disposed adjacent the motor and configured to receive an end of the drive shaft, the protection assembly comprising a protection assembly housing enclosing a protective fluid chamber, the protective fluid chamber comprising the driven magnet and a at least a portion of a bearing configured to engage the end of the drive shaft.

In an Example 25, the blood pump of Example 24, the protection assembly housing comprising a cup washer having a base and peripheral wall extending away from the base, forming a cavity bounded, in part, by an inner surface of the peripheral wall and an inner surface of the base.

In an Example 26, the blood pump of Example 25, wherein at least a portion of the protective fluid chamber is defined between the inner surface of the peripheral wall of the cup washer, an inner surface of the base of the cup washer, and at least a first side of the bearing.

In an Example 27, the blood pump of Example 24, wherein the entire bearing is disposed within the protective fluid chamber.

In an Example 28, the blood pump of Example 24, further comprising a coating disposed on the outer surface of the driven magnet.

In an Example 29, the blood pump of Example 28, the coating comprising at least one of an amorphous silicone, a diamond-like coating, and a polymeric compound.

In an Example 30, the blood pump of Example 29, wherein the rotor is integrated with the impeller.

In an Example 31, the blood pump of Example 30, wherein the coating is disposed over an outside surface of the impeller.

In an Example 32, a blood pump, comprising: an impeller; a drive shaft coupled to the impeller and configured to rotate with the impeller; a rotor integrated with the impeller and configured to rotate with the drive shaft, the rotor comprising a driven magnet having an outer surface; a coating disposed on the outer surface of the driven magnet; a stator disposed adjacent the rotor and configured to drive the rotor, causing the rotor to rotate; and a motor configured to drive the stator.

In an Example 33, the blood pump of Example 32, wherein the coating is disposed over an outside surface of the impeller.

In an Example 34, the blood pump of Example 32, the coating comprising at least one of an amorphous silicone, a diamond-like coating, and a polymeric compound.

In an Example 35, the blood pump of Example 32, further comprising a protection assembly disposed adjacent the motor and configured to receive an end of the drive shaft, the protection assembly comprising a protection assembly housing enclosing a protective fluid chamber, the protective fluid chamber comprising the driven magnet and at least a portion of a bearing configured to engage the end of the drive shaft.

While multiple embodiments are disclosed, still other embodiments of the presently disclosed subject matter will become apparent to those skilled in the art from the following detailed description, which shows and describes illustrative embodiments of the disclosed subject matter. Accordingly, the drawings and detailed description are to be regarded as illustrative in nature and not restrictive.

Figure 1:
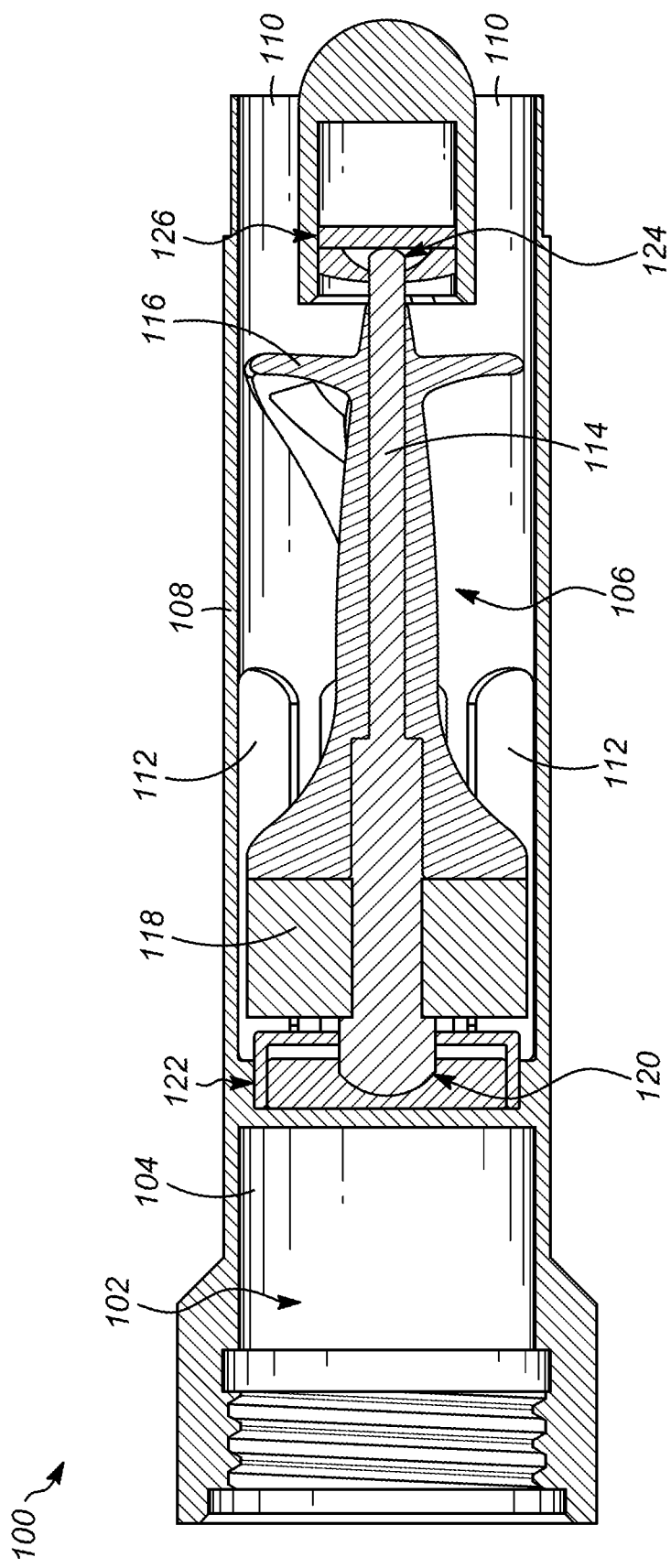
FIG. 1 depicts a cross-sectional side view of a portion of an illustrative percutaneous mechanical circulatory support device (also referred to herein, interchangeably, as a "blood pump"), in accordance with embodiments of the subject matter disclosed herein.

While the disclosed subject matter is amenable to various modifications and alternative forms, specific embodiments have been shown by way of example in the drawings and are described in detail below. The intention, however, is not to limit the subject matter disclosed herein to the particular embodiments described. On the contrary, the disclosure is intended to cover all modifications, equivalents, and alternatives falling within the scope of the subject matter disclosed herein, and as defined by the appended claims.

DETAILED DESCRIPTION

Embodiments of the subject matter disclosed herein include mechanical circulatory support device designs that facilitate protecting magnetic components thereof from corrosion, and may also facilitate protecting a patient from potentially cytotoxic materials and/or hemolysis. In embodiments, for example a magnetic rotor may be sealed from the environment by disposing a protective coating on the outside surface of the rotor and/or by encasing the rotor within a protection assembly housing. A protective fluid may be used to provide a fluid film at bearing surfaces such as, for example, to minimize corrosion. According to embodiments, any number of different types of protective fluids may be used such as, for example, hydrophobic, water-insoluble lubricants (e.g., perfluoropolyether or poly-alpha-olefins classes of synthetic lubricants).

FIG. 1 depicts a cross-sectional side view of a portion of an illustrative percutaneous mechanical circulatory support device 100 (also referred to herein, interchangeably, as a "blood pump"), in accordance with embodiments of the subject matter disclosed herein. As shown in FIG. 1A, the circulatory support device 100 includes a motor 102 disposed within a motor housing 104. The motor 102 is configured to drive an impeller assembly 106 to provide a flow of blood through the device 100. The impeller assembly 106 is disposed within an impeller assembly housing 108, which includes a number of inlet apertures 110 and a number of outlet apertures 112 defined therein. According to embodiments, the motor housing 104 and the impeller assembly housing 108 may be integrated with one another. In other embodiments, the motor housing 104 and the impeller assembly housing 108 may be separate components configured to be coupled together, either removeably or permanently.

A controller (not shown) is operably coupled to the motor 102 and is configured to control the motor 102. The controller may be disposed outside the housing 104 (e.g., in a catheter handle, independent housing, etc.). In embodiments, the controller may include multiple components, one or more of which may be disposed within the housing 104. According to embodiments, the controller may be, include, or be included in one or more Field Programmable Gate Arrays (FPGAs), one or more Programmable Logic Devices (PLDs), one or more Complex PLDs (CPLDs), one or more custom Application Specific Integrated Circuits (ASICs), one or more dedicated processors (e.g., microprocessors), one or more central processing units (CPUs), software, hardware, firmware, or any combination of these and/or other components. Although the controller is referred to herein in the singular, the controller may be implemented in multiple instances, distributed across multiple computing devices, instantiated within multiple virtual machines, and/or the like.

As shown in FIG. 1, the impeller assembly 106 includes a drive shaft 114 and an impeller 116 coupled thereto, where the drive shaft 114 is configured to rotate with the impeller 116. As shown, the drive shaft 114 is at least partially disposed within the impeller 116. In embodiments, the drive shaft 114 may be attached to one or more ends of the impeller 116. In embodiments, the drive shaft 114 and impeller 116 may be integrated as a single piece. In embodiments, the drive shaft 114 may be made of any number of different rigid materials such as, for example, steel, titanium alloys, cobalt chromium alloys, nitinol, high-strength ceramics, and/or the like. The impeller assembly 106 further includes an impeller rotor 118 coupled to, and at least partially surrounding, the drive shaft 114. The impeller rotor 118 may be any type of magnetic rotor capable of being driven by a stator that is part of the motor 102. In this manner, as a magnetic field is applied to the impeller rotor 118 by the stator in the motor 102, the rotor 118 rotates, causing the drive shaft 114 and impeller 116 to rotate. Although various components in FIG. 1 have been illustrated as being spaced apart from one another, to facilitate clarity of description of the subject matter disclosed herein, in embodiments, the rotor 118 may be configured to extend as far as possible toward the stator without interfering with the motor housing 104 to avoid decoupling between the rotor 118 and the stator. According to embodiments, the motor 102 may include any number of additional rotors and/or stators not depicted herein.

As shown, the impeller assembly 106 is maintained in its orientation by the drive shaft 114, which is retained, at a first end 120, by a first bearing 122 and, at a second end 124, by a second bearing 126. According to embodiments, the first bearing 122 and the second bearing 126 may include different types of bearings. According to embodiments, the first bearing 122 and/or the second bearing 126 may include lubrication, while, in other embodiments, one and/or the other may not include lubrication. Various embodiments of bearing technology are contemplated herein with respect to the first and second bearings 122 and 126. In embodiments, an area around the rotor may be filled with a material that facilitates preventing water and/or blood from contacting the rotor surfaces.

According to embodiments, the rotor 118 also may include a protective coating disposed on an outer surface thereof. For example, the coating may include a corrosion-resistant coating such as an amorphous silicone, a diamond-like coating, a polymeric compound, and/or the like. In embodiments, the protective coating may be configured to cover at least a portion of the rotor 118. For example, in embodiments, the protective coating may be configured to cover the entire outer surface of the rotor 118, while in other embodiments, the protective coating may be configured to cover a portion of the outer surface of the rotor 118. In embodiments, the rotor 118 is integrated with the impeller 116 and the protective coating is at least partially disposed over an outside surface of the impeller (and, thus, the rotor 118).

The illustrative circulatory support device 100 shown in FIG. 1 is not intended to suggest any limitation as to the scope of use or functionality of embodiments of the present disclosure. The illustrative circulatory support device 100 also should not be interpreted as having any dependency or requirement related to any single component or combination of components illustrated therein. Additionally, various components depicted in FIG. 1 may be, in embodiments, integrated with various ones of the other components depicted therein (and/or components not illustrated), all of which are considered to be within the ambit of the present disclosure.

Figure 2A:
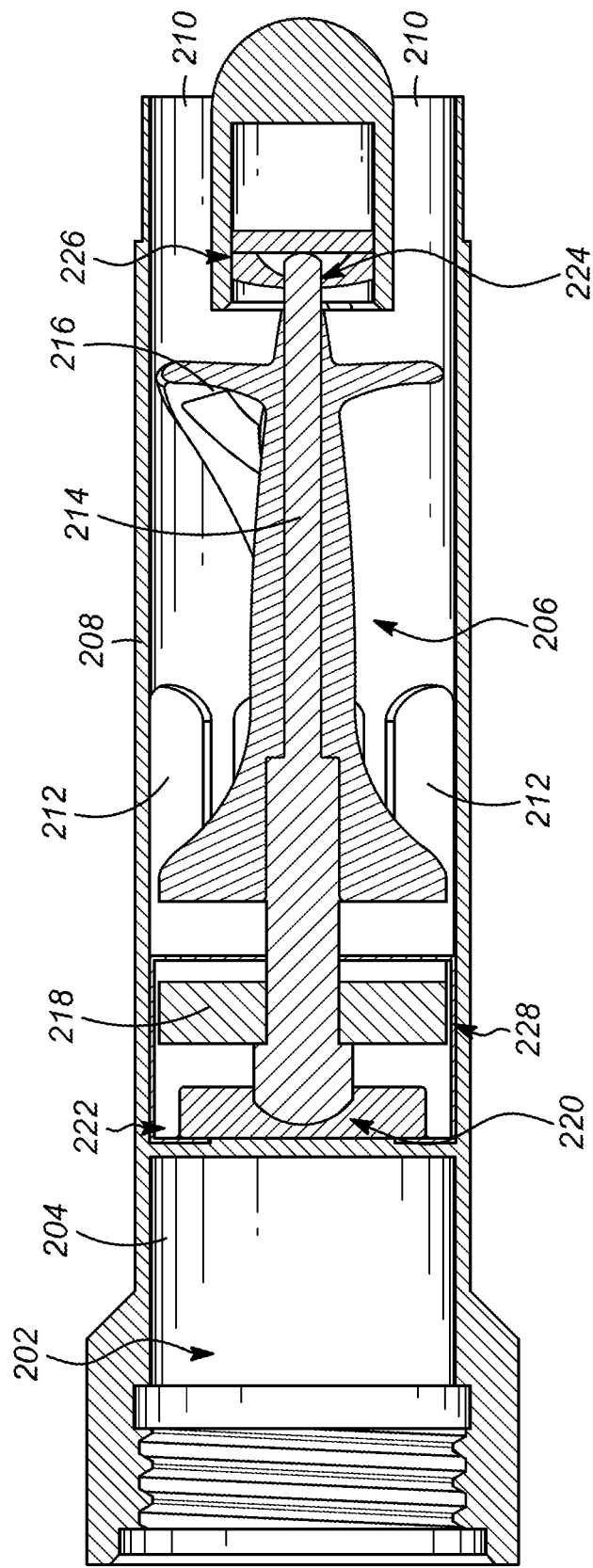
FIG. 2A depicts a perspective view of an illustrative percutaneous mechanical circulatory support device, in accordance with embodiments of the subject matter disclosed herein.

FIG. 2A depicts a cross-sectional side view of a portion of an illustrative percutaneous mechanical circulatory support device 200 (also referred to herein, interchangeably, as a "blood pump"), in accordance with embodiments of the subject matter disclosed herein. As shown in FIG. 2A, the circulatory support device 200 includes a motor 202 disposed within a motor housing 204. The motor 202 is configured to drive an impeller assembly 206 to provide a flow of blood through the device 200. The impeller assembly 206 is disposed within an impeller assembly housing 208, which includes a number of inlet apertures 210 and a number of outlet apertures 212 defined therein. According to embodiments, the motor housing 204 and the impeller assembly housing 208 may be integrated with one another. In other embodiments, the motor housing 204 and the impeller assembly housing 208 may be separate components configured to be coupled together, either removeably or permanently.

A controller (not shown) is operably coupled to the motor 202 and is configured to control the motor 202. The controller may be disposed outside the housing 204 (e.g., in a catheter handle, independent housing, etc.). In embodiments, the controller may include multiple components, one or more of which may be disposed within the housing 204. According to embodiments, the controller may be, include, or be included in one or more Field Programmable Gate Arrays (FPGAs), one or more Programmable Logic Devices (PLDs), one or more Complex PLDs (CPLDs), one or more custom Application Specific Integrated Circuits (ASICs), one or more dedicated processors (e.g., microprocessors), one or more central processing units (CPUs), software, hardware, firmware, or any combination of these and/or other components. Although the controller is referred to herein in the singular, the controller may be implemented in multiple instances, distributed across multiple computing devices, instantiated within multiple virtual machines, and/or the like.

As shown in FIG. 2A, the impeller assembly 206 includes a drive shaft 214 and an impeller 216 coupled thereto, where the drive shaft 214 is configured to rotate with the impeller 216. As shown, the drive shaft 214 is at least partially disposed within the impeller 216. In embodiments, the drive shaft 214 may be made of any number of different rigid materials such as, for example, steel, titanium alloys, cobalt chromium alloys, nitinol, high-strength ceramics, and/or the like. The impeller assembly 206 further includes an impeller rotor 218 coupled to, and at least partially surrounding, the drive shaft 214. The impeller rotor 218 may be any type of magnetic rotor capable of being driven by a stator (not shown) that is part of the motor 202. In this manner, as a magnetic field is applied to the impeller rotor 218 by the stator in the motor 202, the rotor 218 rotates, causing the drive shaft 214 and impeller 216 to rotate.

As shown, the impeller assembly 206 is maintained in its orientation by the drive shaft 214, which is retained, at a first end 220, by a first bearing 222 and, at a second end 224, by a second bearing 226. According to embodiments, the first bearing 222 and the second bearing 226 may include different types of bearings. According to embodiments, the first bearing 222 and/or the second bearing 226 may include lubrication, while, in other embodiments, one and/or the other may not include lubrication. Various embodiments of bearing technology are contemplated herein with respect to the first and second bearings 222 and 226.

As is shown in FIG. 2A, the circulatory support device 200 also includes a protection assembly 228 disposed adjacent the stator and configured to protect at least the rotor 218 from corrosion and/or other wear. In embodiments, the protection assembly 228 may be configured to maintain a volume of protective fluid in contact with the rotor 218. The protective fluid may be, for example, a hydrophobic lubricant. The protective fluid may be any type of hydrophobic lubricant suitable for use in a blood pump. For example, in embodiments, but without intending to limit the disclosure, the protective fluid may be a modified silicone lubricant such as, for example, a modified Polydimethylsiloxane (PDMS). In other embodiments, the protective fluid may be an oil-based lubricant, a synthetic oil, a carbon-based lubricant, and/or the like.

Figure 2B:
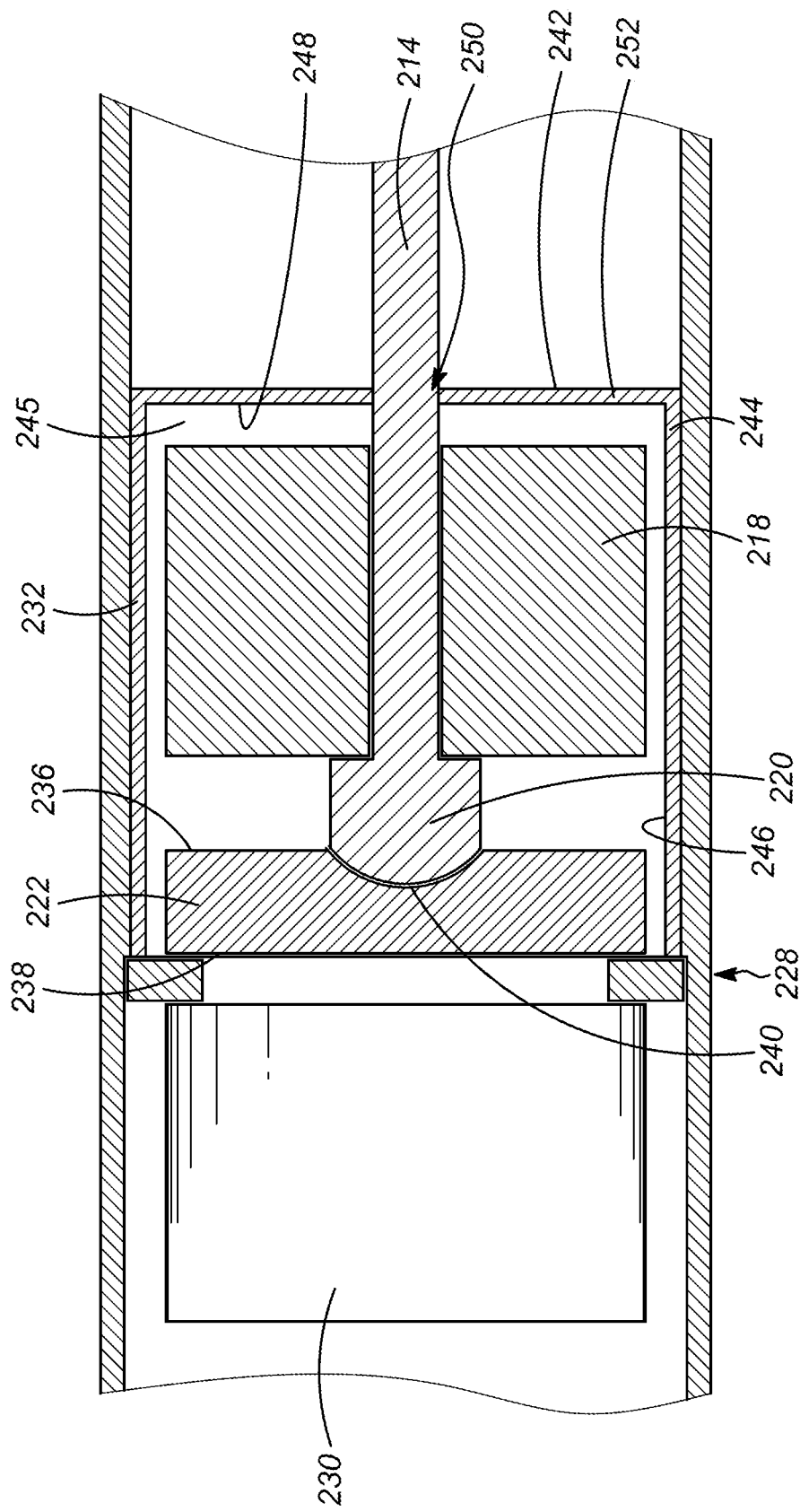
FIG. 2B depicts a cross-sectional side view of the circulatory support device depicted in FIG. 2A, in accordance with embodiments of the subject matter disclosed herein.

FIG. 2B is a close-up view of the protection assembly 228 of FIG. 2A, in accordance with embodiments of the subject matter disclosed herein. As shown in FIG. 2B, the protection assembly 228 is disposed adjacent a stator 230, which is coupled to (or integrated with) the motor 204. The protection assembly 228 is configured to receive an end 220 of the drive shaft 214 and includes a protection assembly housing 232 enclosing a protective fluid chamber 245. According to embodiments, the protective fluid chamber 245 also includes the rotor 218 (driven magnet) and at least a portion of the first bearing 222, which is configured to engage the end 220 of the drive shaft 214.

For example, the bearing 222 may include a first side 236, facing toward the impeller assembly 206, and an opposite, second side 238, facing toward the motor 204. A concave depression 240 is defined in the first side 236 of the bearing 222. The concave depression 240 is configured to receive the first end 220 of the drive shaft 214. As shown, the first end 220 of the drive shaft 214 may be at least partially rounded and, in embodiments, may include a curvature corresponding to the curvature of the concave depression 240. In this manner, the surface area of contact between the drive shaft 214 and the bearing 222 may be as small as possible, reducing the chance that any blood cells will be able to get between the drive shaft 214 and the bearing 222 at their interface.

According to embodiments, the protection assembly housing 232 includes a base 242 and peripheral wall 244 extending away from the base 242, forming a cavity 245 bounded, in part, by an inner surface 246 of the peripheral wall 244 and an inner surface 248 of the base 242. According to embodiments, for example, at least a portion of the protective fluid chamber 245 is defined between the inner surface 246 of the peripheral wall 244 and the inner surface 248 of the base 236, and at least the first side 236 of the bearing 222. In embodiments, the protection assembly housing 232 may be, or include, a cup washer.

The peripheral wall 244 may be oriented approximately orthogonal to the base 242. A shaft aperture 250 may be defined through the base 242, extending from an outer surface 252 of the base 242 to the inner surface 248 of the base 242, and may be configured to receive a portion of the drive shaft 214. As shown, the bearing 222 may be configured to be at least partially disposed within the cavity 245. Additionally, the rotor 218 is configured to be at least partially disposed within the cavity 245.

According to embodiments, the rotor 218 also may include a protective coating disposed on an outer surface thereof. For example, the coating may include an amorphous silicone, a diamond-like coating, a polymeric compound, and/or the like. In embodiments, the protective coating may be configured to cover at least a portion of the rotor 218. For example, in embodiments, the protective coating may be configured to cover the entire outer surface of the rotor 218, while in other embodiments, the protective coating may be configured to cover a portion of the outer surface of the rotor 218. In embodiments, the rotor 218 is integrated with the impeller 216 and the protective coating is at least partially disposed over an outside surface of the impeller (and, thus, the rotor 218).

The illustrative circulatory support device 200 shown in FIGS. 2A and 2B is not intended to suggest any limitation as to the scope of use or functionality of embodiments of the present disclosure. The illustrative circulatory support device 200 also should not be interpreted as having any dependency or requirement related to any single component or combination of components illustrated therein. Additionally, various components depicted in FIGS. 2A and 2B may be, in embodiments, integrated with various ones of the other components depicted therein (and/or components not illustrated), all of which are considered to be within the ambit of the present disclosure.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

We claim:

1. A blood pump, comprising:
   an impeller;

a drive shaft coupled to the impeller and configured to rotate with the impeller, the drive shaft defining a longitudinal axis;

a rotor coupled to the drive shaft and configured to rotate with the drive shaft, the rotor comprising a driven magnet having an outer surface including a first surface facing the impeller and an opposing second surface;

a coating disposed on the outer surface of the driven magnet;

a motor configured to drive the rotor, causing the rotor to rotate;

a protection assembly disposed adjacent the motor and configured to receive a convex end of the drive shaft, the protection assembly comprising a protection assembly housing defining a protective fluid chamber, the protective fluid chamber sealed around the driven magnet and a bearing, the bearing comprising a bearing face including a concave depression receiving the convex end of the drive shaft within the protective fluid chamber, the bearing face being longitudinally spaced apart from the second surface of the driven magnet and defining a gap therebetween, the bearing being disposed between the motor and the driven magnet; and an impeller assembly housing comprising a cylindrical wall defining an internal chamber, the driven magnet and the impeller being disposed within and configured to rotate relative to the impeller assembly housing, and the protection assembly housing disposed within the internal chamber;

wherein the entire bearing is disposed within the protective fluid chamber of the protection assembly housing.

2. The blood pump of claim 1, the coating comprising at least one of an amorphous silicone and a polymeric compound.

3. The blood pump of claim 1, wherein the rotor is integrated with the impeller.

4. The blood pump of claim 3, wherein the coating is disposed over an outside surface of the impeller.

5. The blood pump of claim 1, the protection assembly housing comprising a cup washer having a base and peripheral wall extending away from the base, forming a cavity bounded, in part, by an inner surface of the peripheral wall and an inner surface of the base.

6. The blood pump of claim 5, wherein at least a portion of the protective fluid chamber is defined between the inner surface of the peripheral wall of the cup washer, an inner surface of the base of the cup washer, and at least a first side of the bearing.

7. A blood pump, comprising:
an impeller;
a drive shaft coupled to the impeller and configured to rotate with the impeller, the drive shaft defining a longitudinal axis;

a rotor integrated with the impeller and configured to rotate with the drive shaft, the rotor comprising a driven magnet having an outer surface including a first surface facing the impeller and an opposing second surface;

a corrosion-resistant coating disposed on the outer surface of the driven magnet; a motor configured to drive the rotor, causing the rotor to rotate;

a protection assembly disposed adjacent the motor and configured to receive a convex end of the drive shaft, the protection assembly comprising a protection assembly housing defining a protective fluid chamber, the protective fluid chamber sealed around the driven magnet and a bearing, the bearing comprising a bearing face including a concave depression receiving the convex end of the drive shaft within the protective fluid chamber, the bearing face being longitudinally spaced apart from the second surface of the driven magnet and defining a gap therebetween, the bearing being disposed between the motor and the driven magnet, the protection assembly housing comprising a cup washer having a base and peripheral wall extending away from the base, forming the protective fluid chamber bounded, in part, by an inner surface of the peripheral wall and an inner surface of the base;

an impeller assembly housing comprising a cylindrical wall defining an internal chamber, the driven magnet and the impeller being disposed within and configured to rotate relative to the impeller assembly housing, and the protection assembly housing disposed within the internal chamber;

wherein the entire bearing is disposed within the protective fluid chamber of the protection assembly housing.

8. The blood pump of claim 7, wherein the corrosion-resistant coating is disposed over an outside surface of the impeller.

9. The blood pump of claim 7, the corrosion-resistant coating comprising at least one of an amorphous silicone and a polymeric compound.

10. The blood pump of claim 1, wherein the protective fluid chamber is filled with a hydrophobic fluid.

11. The blood pump of claim 7, wherein the protective fluid chamber is filled with a hydrophobic fluid.

* * * * *